Nov. 17, 1953  C. A. ANDERSON  2,659,857
INSTRUMENT FOR INDICATING PERMEABILITY
Filed June 1, 1951  2 Sheets-Sheet 1
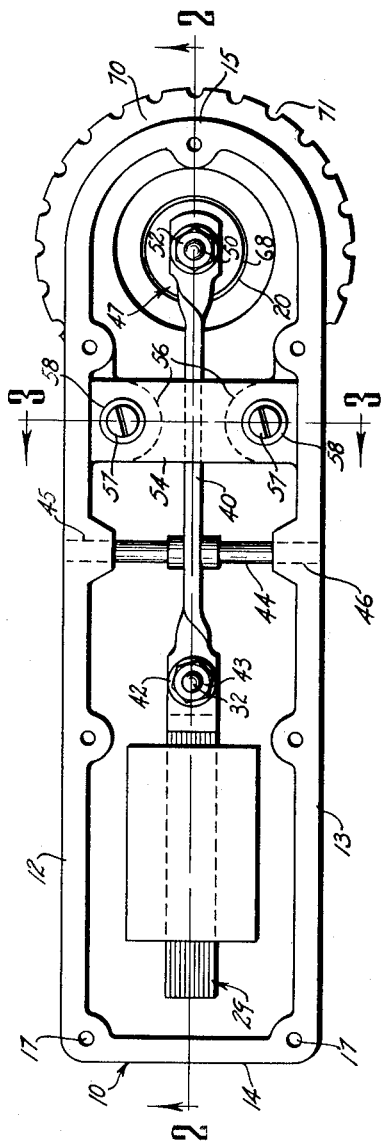
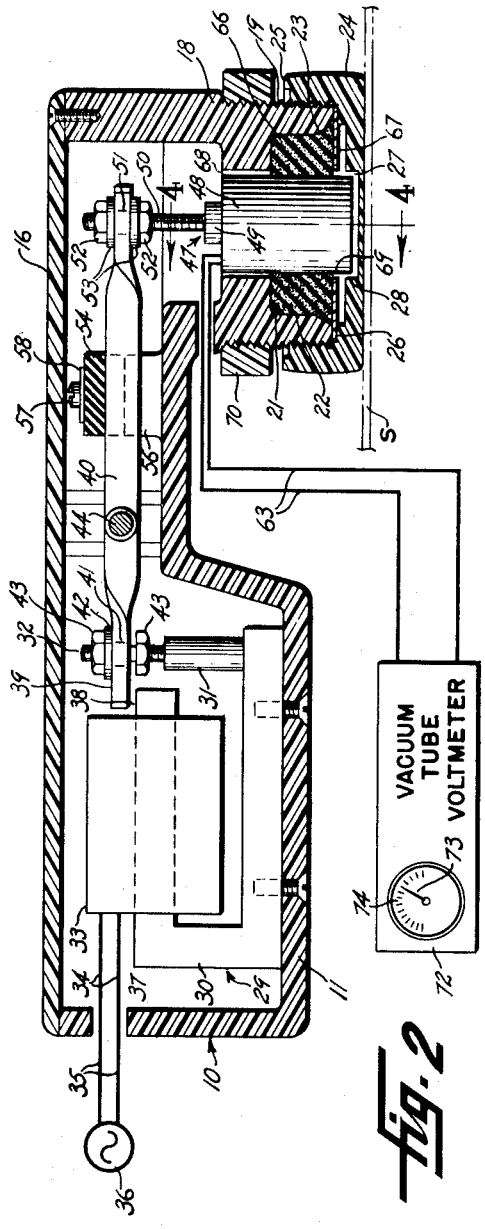
CLARENCE A. ANDERSON
*INVENTOR.*
BY *S. Tierney Jr.*
ATTORNEY Nov. 17, 1953  C. A. ANDERSON  2,659,857
INSTRUMENT FOR INDICATING PERMEABILITY
Filed June 1, 1951  2 Sheets—Sheet 2

CLARENCE A. ANDERSON
*INVENTOR.*
BY S. Tierney Jr.
ATTORNEY

Patented Nov. 17, 1953

2,659,857

UNITED STATES PATENT OFFICE 2,659,857

INSTRUMENT FOR INDICATING
PERMEABILITY

Clarence A. Anderson, San Diego, Calif.

Application June 1, 1951, Serial No. 229,397

10 Claims. (Cl. 324—34)

This invention relates to an instrument and method for determining and indicating the magnetic permeability of objects and especially of structural members formed of steel, stainless steel or one of the modern alloys, composed of paramagnetic materials such as nickel, cobalt and their alloys.

An object of the invention is to provide an instrument capable of easily and quickly measuring the permeability of any material and more especially paramagnetic materials such as steel, stainless steel, alloys of nickel and cobalt and other non-ferrous metals. The device is capable of making such measurements whether the material is flat sheet stock or curved to a desired shape by a forming operation.

Another object is to provide an instrument whose use permits the selection from a stock of metal sheets of those whose composition and internal structure make them desirable for use in critical forming operations involving much bending of the material.

A further object is to provide an instrument capable of detecting whether a metal part has been cold worked, the indications of the instrument being affected by changes in the metal structure due to such working as, for example, internal stresses and variations in hardness.

Another object is to provide an instrument adapted to determine whether or not a formed metal part requires annealing before further forming operations are done on it.

A further object is to provide an instrument capable of determining whether an assembly of welded metal parts requires annealing before the structure is placed in service.

Another object is to provide a portable instrument capable of quickly determining the presence or absence of metallic members which may be concealed in a structure as, for example, concealed nails or screws, electrical wall boxes and other items concealed in completed structures.

Further objects will become apparent as the description of the instrument proceeds. For a better understanding of the invention, reference is made to the accompanying drawing, in which:

Figure 1 is a top view of an instrument embodying the invention;

Figure 2 is a side view partly in section on line 2—2 of Figure 1 also showing a connected indicating meter schematically;

Figure 3:
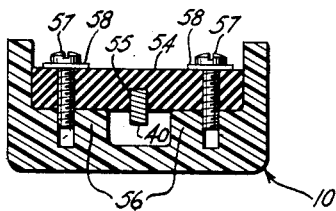
Figure 3 is a sectional view of the instrument on line 3—3 of Figure 1.
Figure 4:
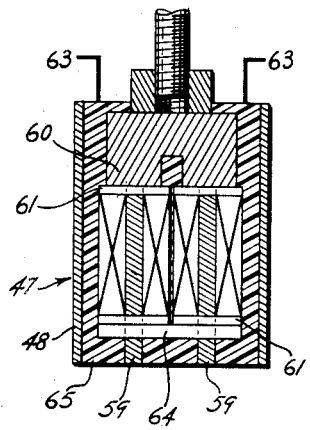
Figure 4 is a sectional view of the pickup on an enlarged scale, taken on line 4—4 of Figure 2.

In industries forming sheet metal to various shapes by pressing, drawing or stretching operations, the physical condition of the metal is an important factor. This is especially so in the case of articles to be made of steel, stainless steel or one of the modern alloys composed of non-ferrous metals. It has been discovered that certain internal conditions of the metal which adversely affect its utility, cause a change in its magnetic permeability and that the presence or absence of such undesirable internal conditions may be detected by measuring the permeability of the metal. Among such internal conditions may be mentioned internal stresses and variations in hardness resulting from previous cold working of the metal and internal cracks or other flaws. This invention provides a method and instrument whereby large areas of metal may be quickly explored and the presence of an abnormal or defective spot indicated by a flash of light, ringing of a bell, movement of the pointer of a measuring instrument, or other indicating device.

Referring to Figures 1 to 4, the illustrated embodiment of the invention shows an electrically operated device mounted in a housing or casing 10 preferably cast of Bakelite or other thermosetting resin, the casing having a bottom wall 11, side walls 12 and 13 which are connected by straight end wall 14 and curved end wall 15. The top or cover 16 is removable and is secured in position by several screws threaded into the tapped holes 17. If the indicating device, to be later described, is mounted in casing 10, cover 16 or at least the portion thereof which is over the graduated scale and indicating pointer, is made of a suitable transparent thermosetting resin or other transparent material. At one end casing 10 continues below the level of bottom 11 to form a cylindrical shaped support 18 having the screw thread 19. Support 18 has a cylindrical hole 20 which connects with a larger opening 21, the marginal wall of 21 having a cylindrical portion 22 terminating in a tapering wall 23. A non-metallic, circular closure cap 24 of rigid material is screwed onto thread 19, the cap terminating in a narrow top face 25 and having a narrow interior ledge 26. At its center cap 24 has a recess 27, the wall 28 of cap 24 below this recess preferably having a thickness of from 3 to 10 thousandths of an inch, to provide a small air gap in a magnetic circuit to be later described. An alternating current electromagnet 29 is mounted within casing 10, the magnet having a soft iron core 30 formed of laminations and which includes a vertical support 31 for a threaded screw 32. The magnet is provided with a wire coil 33 whose insulation covered leads 34 pass through wall 14 of the casing and are connected by a flexible extension cord 35 to any wall outlet to which 60 cycle alternating current is supplied from a commercial power source 36. Core 30 includes a horizontal limb 37 which passes through coil 33 and the end of which is separated by a small air gap 38 from the end 39 of a soft steel armature 40. Screw 32 passes through a hole 41 in the armature which is slightly larger than the screw and the length of air gap 38 and also the extent of movement of the armature are regulated by a pair of nuts 42 the upper of which bears against a soft rubber washer 43. Armature 40 has secured to it a steel shaft 44 which provides a pivotal support, the ends of the shaft being received in a pair of cylindrical holes 45, 46 in a pair of bosses on casing walls 12 and 13.

Armature 40 reciprocates a pickup 47 contained in a cylindrical casing 48 formed of non-ferrous metal and from which protrudes an internally threaded brass cap 49. Pickup 47 is supported by armature 40 on a screw 50 which is threaded into cap 49 and passes through a hole 51 in the armature which is slightly larger than the screw. Vertical adjustment of pickup 47 is effected by a pair of nuts 52 between which and the armature are seated a pair of soft rubber washers 53. Means for damping spurious vibrations of the armature is provided by a resilient rubber pad 54 which is slotted at 55 to receive armature 40 (see Figure 3), the degree of compression of this pad also serving to control the sensitivity of the instrument. The pad is secured to a pair of bosses 56 formed integral with casing 10, by means of a pair of screws 57 screwed into the bosses, a washer 58 of nonferrous metal being seated under the head of each screw. The compression of pad 54 also assures its pressing against the sides of armature 40 to keep it centered.

Pickup 47 comprises a pair of short, thin, soft iron strips 59, rectangular in cross section and which are strongly magnetized by an Alnico magnet 60 which is connected to and bridges their upper ends to form a U-shaped electromagnet. A spool 61 is mounted on and surrounds each strip 59, each spool having wound thereon a coil 62 of fine copper wire and at one end the coils are connected together. The other ends of the coils are connected to a pair of leads 63 (see Figure 2) and the coils are wound in such directions that the voltages generated therein are additive. A thin retainer 64 made of insulation material or brass and having holes to receive the ends of strips 59, abuts against the lower ends of spools 61 and supports them during the assembly of the pickup. Cap 49 is secured to the top of magnet 60 by welding or other known means. After assembly of pickup 47, it is placed in casing 48 with the lower ends of core strips 59 substantially level with the bottom of the casing and the casing is then filled with a hot filling 65 of suitable insulation material which sets hard upon cooling. This filling prevents any relative movement between the several parts of the pickup and also protects them against the entrance of moisture, metallic dust particles and other foreign materials.

A sponge rubber collar 66 is seated within opening 21 and placed under compression by a thin insulating washer 67 against which the ledge 26 abuts. The opening 20 and the opening in washer 67 are large enough to provide small clearance spaces 68, 69 around casing 48. A locknut 70 having a serrated edge 71 is screwed onto thread 19 above the cap 24 for a purpose to be later described.

The voltage generated in coils 62 is transmitted by leads 63 (see Figure 2) to the input terminals of a vacuum tube voltmeter 72 shown schematically and having a movable pointer 73 and a fixed graduated scale 74. This meter may include one or more transformer coupled vacuum tube amplifier stages and serves to indicate the peak voltages developed. Instead of voltage graduations, its scale 74 may be calibrated in units of permeability, if preferred. It will be understood that any other type of electrical measuring instrument which is responsive to small voltage variations as, for example, an oscilloscope or cathode ray tube with luminous screen, may be substituted for meter 72.

To operate the instrument, extension cord 35 is connected to a wall socket, whereupon electromagnet 29 causes armature 40 to vibrate at the rate of 60 cycles per second. Pickup 47 is then raised or lowered by adjusting nuts 52 so that the washers 53 engage the armature and the casing 48 is slightly above wall 28 when the cap 24 is screwed up to within a quarter to a half turn of its topmost position. Rubber pad 54 is then compressed by turning screws 57 thereby applying a downward pressure to armature 40. Upper nut 42 is next adjusted to provide a minimum air gap 38 and to put washer 43 under compression. This adjustment assures the transmission of substantially maximum power to armature 40. Washer 67 now has rubber collar 66 under compression so that the collar presses in against the surface of casing 48 and maintains the casing centrally in hole 20. Rubber washers 43 and 53, pad 54 and collar 66 all cooperate in damping out spurious vibrations of the moving parts of the system and, in effect, tuning the assemblage of moving parts to the resonant frequency of 60 cycles. This is important, as any spurious vibrations transmitted to pickup 47 would cause false readings on meter 72. The casing 10 is then placed on a standard sheet S of paramagnetic metal whose permeability is of known value as, for example, 100 with the bottom of cap 24 flat on the sheet. Indicator 73 will now give a certain meter reading on scale 74. If this reading is 100, locknut 70 is tightened against cap 24 to lock it in position. If the scale reading is not 100, cap 24 is slowly rotated to adjust the air gap between the end of magnet core 59 and sheet S until the meter reads 100. Locknut 70 is then rotated to lock cap 24 in correct position. To determine the permeability of any other metal sheet or other article, it is only necessary to hold the end of cap 24 against it and observe the meter reading. A magnetic flux path of substantial intensity is formed through magnet 60, core strips 59, the air gap and the adjacent region of sheet S and the variations of the flux in this path depend on the magnetic permeability of the material under test. The peak voltage generated in pickup coils 62 and the reading of meter 72 are thus functions of the permeability, this instrument thus permitting its ready measurement. Voltmeter 72 may be mounted on a wall within easy view of the operator or it may be mounted in casing 10 so that the scale may be read through the cover 16 of the casing.

It has been found that the instrument may be used to easily locate objects which contain paramagnetic material and are concealed in a structure. For example, the presence of a concealed nail or screw in a board may be quickly determined by sliding the cap 24 along the board. When the nail is reached and comes within the magnetic flux path of the instrument, a substantial deflection of pointer 73 will occur. Also by sliding the cap 24 along the surface of the plastered wall of an old building which has been altered, electrical outlet boxes and other concealed metal articles which have been plastered over may be easily located, the reading of meter 72 being a maximum when cap 24 is directly over the article.

Figure 5:
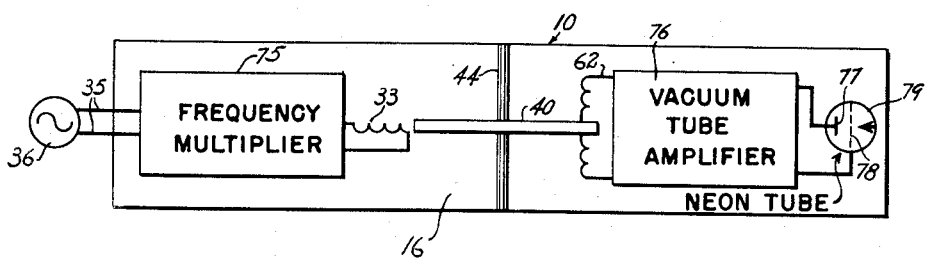
Figure 5 is a top view of a modified form of the instrument shown schematically.
Figure 6:
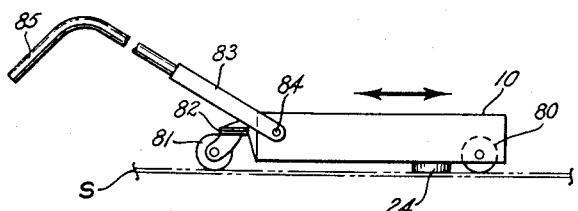
Figure 6 is a side view of the instrument of Figure 5 on a reduced scale also showing means for supporting it.

Figures 5 and 6 show an embodiment of the invention generally similar to that above described but in which the indicating instrument is mounted in casing 10. In this embodiment the frequency of the 60 cycle A. C. current supplied through extension cord 35 is multiplied to 120, 180, 240 cycles or other multiple of 60 cycles by a frequency multiplier 75, current of the increased frequency being supplied to electromagnet coil 33. The voltage generated in pickup coil 62 by the increased frequency is greater than that generated by a 60 cycle current, thus making the instrument more sensitive to changes in permeability. The voltage developed in coil 62 is amplified in vacuum tube amplifier 76 and the amplified voltage applied to the cathode 77 and grid 78 of a neon glow tube 79. This tube is preferably of the cold cathode type requiring a grid voltage above a certain minimum value to initiate the discharge and cause the emission of red light. The cover 16 of casing 10 is transparent to permit the operator to see the light emitted. The direct current for operating frequency multiplier 75, amplifier 76 and neon tube 79 may be supplied by a battery (not shown) mounted in or attached to casing 10 or by a rectifier and filter circuit (not shown) mounted in or attached to the casing. As shown in Figure 6, casing 10 may be supported by two spaced apart rollers 80 mounted at one end thereof and a single roller 81 mounted on swivel 82, at the middle of the other end. A suitable actuator 83 is pivotally secured to the casing at 84 for moving it, the actuator having an elevated handle 85 for convenient operation.

In using the instrument of Figures 5 and 6 to detect abnormal or undesirable conditions in a large sheet S of metal, such as stainless steel, the sheet is laid out flat on a level wooden or concrete floor. Then by means of handle 85, the operator places rollers 80 and 81 on the sheet and rolls the instrument back and forth across it, the bottom face of cap 24 being in contact with the top of the sheet. If the permeability of the sheet is within a prescribed tolerance, neon tube 79 remains dark. If, however, a region of the sheet has a defect of the type above referred to, the increased permeability will cause a higher voltage to be generated in coil 62 which, in turn, will cause tube 79 to light up. The lighting of tube 79 may therefore be a criterion for the rejection of certain sheets out of a shipment, when such sheets do not meet the standards set up. Or any defective sheet may be annealed or otherwise treated to meet the requirements.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. In an instrument for determining the magnetic permeability of a member at least a portion of which is paramagnetic comprising, in combination: a core of paramagnetic material; a coil surrounding said core and closely coupled thereto; a housing of rigid material surrounding said core and coil; spacing means disposed between an end of said core and the member to cause the said end to follow a path substantially parallel and close to the surface of the member in response to the movement of the core along the member; means for rapidly reciprocating said core while the end thereof is moving along said path; and a damping member formed of resilient material pressing against the outside of said housing to dampen out any spurious vibrations thereof.

2. In an instrument for determining the magnetic permeability of a member at least a portion of which is paramagnetic comprising, in combination: a U-shaped core of paramagnetic material; a coil surrounding the limbs of said core with its ends disposed closely adjacent the surface of the member; electrically operated means arranged to rapidly reciprocate said core and thereby continuously vary the reluctance of the magnetic circuit established through said core and member; and resilient means for guiding said core including a member composed of resilient material arranged to dampen out any spurious vibrations of the core.

3. An instrument as claimed in claim 2; in which said resilient means comprises a rubber washer surrounding said core and coil.

4. A portable instrument for determining the magnetic permeability of different regions of an extensive member composed of paramagnetic material, said instrument comprising, in combination: a generally rectangular shaped casing composed of non-magnetic material, said casing having a body portion terminating in a hollow extension depending below the level of the body portion; an armature pivotally supported in the body portion; a core of paramagnetic material disposed in said extension and having spaced apart ends; a member connecting the top of said core to one end of said armature; an electromagnet near the other end of said armature arranged to rapidly vibrate the armature; and a closure cap of non-magnetic material secured to the lower end of said extension, said cap being arranged to support the ends of said core a predetermined small distance above said member as the instrument is moved along the member.

5. A portable instrument as claimed in claim 4; in which said extension is provided with a screw thread and said cap is screwed onto said screw thread whereby the distance between the ends of said cores and said member may be varied by rotation of said cap.

6. A portable instrument as claimed in claim 4; in which said closure cap at its center is provided with a recess into which the ends of said core extend.

7. A portable instrument as claimed in claim 4;

in which rubber-like material is interposed between the end of the armature and the member which connects the core thereto.

8. A portable instrument as claimed in claim 4; in which a pad of rubber-like material presses against the top of said armature to dampen the vibrations thereof.

9. An instrument for indicating the permeability of various portions of an extensive member at least a portion of which is paramagnetic comprising, in combination: a core of paramagnetic material having spaced apart ends; a coil closely inductively coupled to said core; electrically operated means for rapidly and continuously reciprocating said core over a small distance; an indicating device having a graduated scale and cooperating indicator, said device having a pair of input terminals connected to the ends of said coil; and a substantially closed portable casing enclosing and supporting the aforesaid components, said casing having a depending hollow extension having a thin end wall adapted to slide along the surface of the member and maintain the ends of the core close to the member, said graduated scale and its cooperating indicator being visible from a position above the casing.

10. An instrument as claimed in claim 9; in which a guide member for said core and coil is disposed in said hollow extension, said guide member being composed of resilient material and serving to dampen out any spurious vibrations of the core and coil.

CLARENCE A. ANDERSON.

References Cited in the file of this patent
UNITED STATES PATENTS

| Number | Name | Date |
|---|---|---|
| 1,685,965 | Spooner | Oct. 2, 1928 |
| 2,103,224 | Schweitzer et al. | Dec. 21, 1937 |
| 2,179,240 | Breitenstein | Nov. 7, 1939 |
| 2,196,314 | Lee | Apr. 9, 1940 |
| 2,207,592 | Lenk | July 9, 1940 |
| 2,255,053 | Gunn | Sept. 9, 1941 |
| 2,503,720 | Gieseke | Apr. 11, 1950 |
| 2,528,889 | Kohl | Nov. 7, 1950 |
| 2,542,893 | Bender et al. | Feb. 20, 1951 |
| 2,617,854 | Van Valkenberg | Nov. 11, 1952 |